July 22, 1969

S. ALTSCHULER

3,456,744

VIBRATIONLESS PNEUMATIC TOOL

Original Filed July 12, 1962

SAMUEL ALTSCHULER
INVENTOR.

BY Don Finkelstein

ATTORNEY

July 22, 1969 S. ALTSCHULER 3,456,744
VIBRATIONLESS PNEUMATIC TOOL
Original Filed July 12, 1962 4 Sheets-Sheet 3

SAMUEL ALTSCHULER
INVENTOR.

BY Don Finkelstein
ATTORNEY

3,456,744
VIBRATIONLESS PNEUMATIC TOOL
Samuel Altschuler, 4574 Totana Drive,
Tarzana, Calif. 91356
Continuation of application Ser. No. 209,327, July 12, 1962. This application Nov. 24, 1967, Ser. No. 698,365
Int. Cl. E21c *3/04;* B25d *9/04;* F01b *15/02*
U.S. Cl. 173—137                         14 Claims This application is a continuation of application Ser. No. 209,327, filed July 12, 1962, and now abandoned.

This invention relates to the fluid powered tool art and more particularly to an improved method of and apparatus for providing a substantially vibration free, constant recoil reciprocating type fluid powered tool.

The reciprocating fluid powered tools, such as pneumatic chippers, tampers, jack-hammers, and the like, that have been utilized in the past generally transmit the full recoil reaction of the tool to the utilizer. In addition to requiring considerable strength to operate such tools, the continuous, comparatively high frequency large amplitude forces associated with the recoil reaction often result in serious physical damage to the user. Thus, there has long been a need for a fluid powered reciprocating tool that generates little, if any, cyclical forces to the user. Further, the proposed invention offers an intrinsic means for eliminating the comparatively expensive valve mechanisms generally required in existing tools thus furnishing design simplification, economic advantages, and increasing tool life. Also, the proposed invention offers a means of eliminating operator force, other than tool guidance, in the downward direction and yet requiring only constant force in other orientations.

Prior attempts to provide a vibration free, constant recoil, and valveless reciprocating pneumatic tool have not been generally successful to the best of applicant's knowledge. Such tools have generally included buffers, springs, or other deformable means utilized in tool operation or were not capable of continually holding the tool bit in close contact with the surface of the work. Further, they have not always provided completely reliable operation in that they were not constructed of rugged parts required for the heavy duty tool operations.

Accordingly, it is an object of applicant's invention to provide an improved reciprocating fluid powered tool.

It is an other object of applicant's invention to provide a constant recoil and vibration free reciprocating pneumatic tool.

It is yet another object of applicant's invention to provide a recoil free and vibration free vertically operating reciprocating fluid powered tool that is free of comparatively expensive valve mechanisms.

It is yet another object of applicant's invention to provide a constant recoil and vibration free and valveless reciprocating fluid powered tool operable in any orientation that can maintain steady contact of the tool bit on the work.

The above and other objects are achieved, according to one embodiment of applicant's invention, by providing, in a vibration free reciprocating tool, a barrel member having a reciprocally operable tool bit slidably mounted in one end and a handle incorporating a pressurized fluid inlet at the other end. A tube member is slidably mounted inside the barrel member and has one end axially positioning the tool bit. A sleeve member is slidably mounted inside the tube member and a reciprocating free piston is contained within the sleeve member. The free piston is positioned intermediate the closed end of the sleeve member and the tool bit to provide fluid volumes therebetween. It is adapted to cyclically strike the inner end of the tool bit thereby delivering external work and to cyclically oppose the opposite reactions of the sleeve thereby continually adjusting the free space relationships of the piston and the sleeve. The pressurized fluid may, for example, be a gas, such as air, at a preselected pressure.

Chambers are provided in preselected locations between both the sleeve member and the tube member and between the tube member and the barrel member. Flow passages and piston areas are included between selected air chambers to provide the proper pressure, actuating forces, and venting requirements. Flow between the chambers is cyclically terminated in response to the movement of the various elements in the tool and are governed primarily by the position of the free piston and the sleeve.

Operationally, a cycle may, for example, be considered as beginning when the free piston is starting its rebound from the tool bit and is moving in a backward direction, i.e., towards the handle end of the tool. The tube member is continually forced against the tool bit by the gas pressure throughout operation of this tool. At the time the piston starts backward movement, there is gas pressure between the forward face of the piston and the tool bit and tool bit end of the sleeve member tending to drive the piston backward. The volume between the rear of the piston and the closed end of the sleeve member is vented to atmosphere at this time. As the piston moves backward, the sleeve member moves forward under gas pressure in a peripherally located chamber between the sleeve member and the tube member and between the forward face of the free piston and the sleeve member. As the sleeve member moves forward, a vent passage is closed thereby trapping gas between the rear face of the piston and the closed end of the sleeve member. Also, the volume between the piston and the tool bit is closed thereby retaining the gas therein which expands as the piston moves to the rear. Compression of the gas in the volume between the rear face of the piston and the closed end of the sleeve member tends to decelerate both the piston and the sleeve member without imparting cyclic recoil force to the tube member, barrel member, or the handle. As the sleeve member moves further forward, gas under pressure is introduced into this compressing volume which tends to reduce further travel of both the piston and the sleeve member. Also, the volume between the tool bit and the piston is then vented. Finally, both the piston and sleeve are brought to rest by compression of the gas remaining in the volume between the parts when the piston position closes the rear sleeve inlet port. This compression cyclically compensates for small variations in piston and sleeve velocities. The compressed gas on the rear face of the piston then starts the piston forward to impact on the tool bit and the sleeve is driven in the backward direction to return to its initial position. The piston and sleeve motions are further accelerated by the access of additional inlet compressed fluid as the proper ports are uncovered by the sleeve action. Throughout these actions, constant positioning forces are maintained on the tube member, the sleeve member, and the barrel member which latter thus imparts only constant recoil to the operator. Selection of piston areas based on inlet fluid pressure and barrel weight results in recoilless operation in the downward direction.

The above and other embodiments of this invention are more fully disclosed in the following detailed description with reference to the accompanying drawing wherein similar reference characters refer to similar elements and in which.

Figure 1:
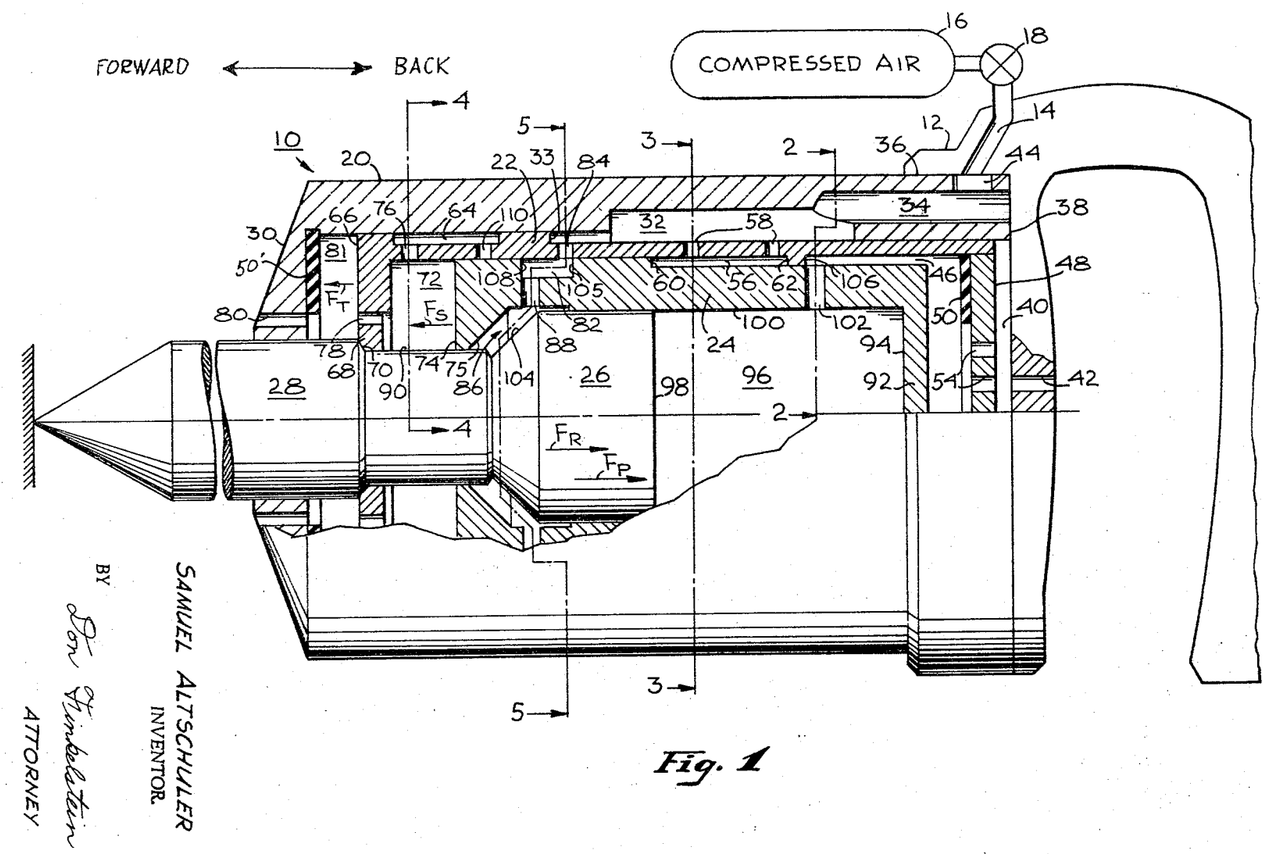
FIGURE 1 is a sectional view of one embodiment of applicant's invention in a first operational position thereof.

Referring now to FIGURE 1, there is shown the structure associated with one embodiment of applicant's invention. For convenience, this embodiment is shown incorporating a chipper arrangement for the tool bit. However, it will be appreciated that applicant's invention herein is adaptable to any fluid pressure operated reciprocating power tool.

A reciprocating fluid power operated tool, generally designated 10 according to applicant's invention, is provided with a handle 12 at the back end thereof and the handle 12 has a fluid inlet 14 to which is connected a supply of fluid under pressure. The fluid, for example, may be compressed air from tank 16 and is admitted to inlet 14 through control valve 18. The central portion of tool 10 is comprised of three concentrically and coaxially mounted members: an outer cylindrical barrel member 20, an intermediate tube member 22 slidably mounted in the interior of barrel member 20, and a sleeve member 24 slidably mounted inside tube member 22. While these members are slidably mounted with respect to each other, the actual fit between the barrel member 20 and the tube member 22 as well as the fit between the sleeve member 24 and the tube member 22 is, in the preferred embodiment, substantially a slip fit. As described below, there are air passages between these members to admit and vent air at preselected times in the working cycle of tool 10.

A free piston 26 is slidably and coaxially mounted on the inside of sleeve member 24, providing a slip fit therebetween and is adapted to reciprocatingly move in sleeve member 24 and cyclically impact against tool bit 28 which is retained in a retainer means 30. The retainer means 30 is coupled to the cylindrical barrel member 20 at the forward end of the tool 10. The retainer means 30 slidably retains the tool bit 28 and guides it during the work strokes thereof.

The slip fits between the barrel member 20 and tube member 22, between tube member 22 and sleeve member 24, and between sleeve member 24 and piston 26 are selected to minimize the air pressure losses during operation. In addition, while the slip fits may allow some leakage of air between the parts, this small loss of operational efficiency has been found by applicant to be more than offset by decreased friction. The slip fits insure that the parts do not bind together which would interfere with the normal operation of tool 10. In the preferred embodiment of applicant's invention, the slidably mounted members are provided with labyrinth seals therebetween to minimize possible air leakage and, in addition, the grooves in a labyrinth seal provide a receptacle for any dirt or grit particles contained in the air supply.

Annular grooves are provided in the barrel member 20 and tube member 22 to provide a first air chamber 32 communicating with the fluid inlet 14 through apertures 34 at one end thereof. First air chamber 32 is filled with air of the supply pressure from tank 16 throughout operation of the tool 10 and provides a means of cyclically supplying other air chambers of tool 10 with air of the supply pressure.

The forward end of the first air chamber 32 is bounded by shoulder 33 of the tube member 22. Since air under pressure is continually in chamber 32, tube means 22 is constantly subjected to a force thereby in the forward direction and this force is equivalent to the product of the supply pressure in chamber 32 multiplied by the area of shoulder 33. As described below, this force is utilized to maintain a constant force on the tool bit 28. The reaction to this force is transmitted to the barrel member 20 and handle 12 to the utilizer of tool 10. However, this force is substantially constant and comparatively small and, therefore, does not present the physically hazardous and much greater cyclical forces associated with the recoil in reciprocating tools of the prior art. The area of the shoulder 33 is selected so that the force transmitted to the tube member 22 and thus to the tool bit 28 is sufficient to cause a positive force in the forward direction regardless of the orientation of the tool 10 with respect to the force of gravity. Therefore, even when the tool 10 is in a vertical orientation with the tool bit 28 positioned upward, the tool bit 28 is still urged in the forward direction and positive cycling is insured.

Figure 2:
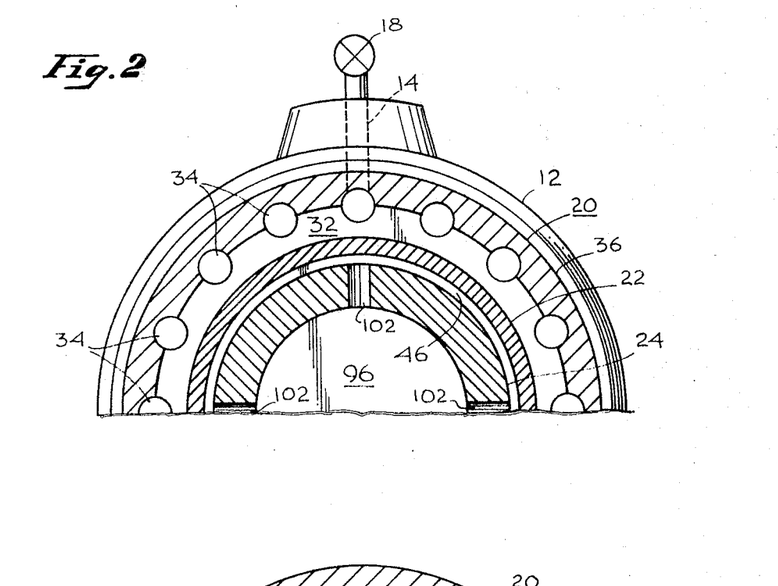
FIGURE 2 is a sectional view taken along the line 2—2 of FIGURE 1.

The handle 12 is rigidly coupled to the barrel member 20 along outer peripheral wall portions 36 thereof and end 38 of barrel member 20 is sealed to the handle 12 to prevent passage of air into a second air chamber 40 which is vented to regions external to tool 10 through port 42. The first air chamber 32 is annular to provide a supply of air symmetrically around the tool 10 so that the forces exerted are constrained to act in axial directions and there is substantially no net radial force. FIGURE 2 shows a sectional view taken along line 2—2 of FIGURE 1. While first air chamber 32 is shown as completely annular, it will be appreciated that it could also be fabricated in a plurality of interconnected annular segments. The apertures 34 comprise a plurality of passages which, for example, may be drilled holes to allow free flow of air from a collector groove 44, which communicates with fluid inlet 14, into the first air chamber 32.

As shown on FIGURE 1, the tube member 22 is provided with annular grooves to form third air chamber 46 adjacent the sleeve member 24. An end portion 48 is coupled to the back end 50 of tube means 22 and is provided with a plurality of axially disposed apertures 54 to allow venting of air from third air chamber 46 to vented second air chamber 40. End portion 48 is adapted to cushion any impact of sleeve member 24 but applicant has found that, in many applications, movement of sleeve 24 does not require cushioning and, hence, end portion 48 may be omitted in such applications. Other resilient members may be included at various locations in tool 10, if desired, but satisfactory operation is obtained without such members. In either event, third air chamber 46 communicates directly with the vented second air chamber 40 and operation is identical to operation of the tool 10 as shown.

A fourth air chamber 56 is provided by annular grooves in tube member 22 and sleeve member 24 and is spaced from third air chamber 46. A plurality of radially disposed interconnecting apertures 58, which may be radial holes, are included in tube member 22 to provide an air passage from first air chamber 32 to fourth air chamber 56. Thus, fourth air chamber 56 is always exposed to the full supply pressure from tank 16 during tool operation. Fourth air chamber 56 is bounded by wall portions of tube member 22 and sleeve member 24. The forward end of fourth air chamber 56 is formed by shoulder 60 of sleeve member 25 and the back end is formed by shoulder 62 of tube member 22. Since it is desired to maintain a constant force on the tool bit 28 in the forward direction, the area of shoulder 62 must be less than the area of shoulder 33 since the air at the supply pressure in fourth air chamber 56 generates a backward directed force on tube member 22. The net force exerted on tube member 22 by the air is the difference between these two forces and may be expressed as:

$$F_T = P_S(A_{33} - A_{62}) \qquad (1)$$

where:

$F_T$ = net air pressure force on tube member 22
$P_S$ = supply pressure
$A_{33}$ = area of shoulder 33
$A_{62}$ = area of shoulder 62

Figure 3:
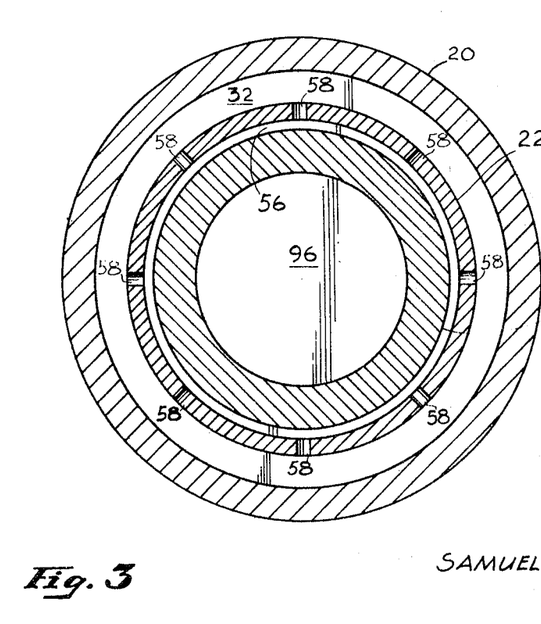
FIGURE 3 is a sectional view taken along the lines 3—3 of FIGURE 1.

FIGURE 3 is a sectional view of the tool 10 shown in FIGURE 1 taken along the line 3—3. The plurality of radial apertures 58 always interconnect first air chamber 32 with fourth air chamber 56 since the shoulder 60 of sleeve member 24 is at its farthest back position for the condition shown on FIGURE 1.

Fifth air chamber 64 of FIGURE 1 is formed by annular grooves in tube member 22 and is spaced from fourth air chamber 56. Fifth air chamber 64 is bounded on its outer periphery by wall portions of barrel member 20 and on its inner periphery, forward end and rear end, by wall portions of tube member 22. An end portion 66 is coupled to the forward end of tube member 22 and has an annular bearing member 68 pressing against a shoulder 70 of tool bit 28. Since the force $F_T$ always acts in the forward direction, tube member 22 exerts a constant forward force on tool bit 28 through bearing member 68.

Figure 4:
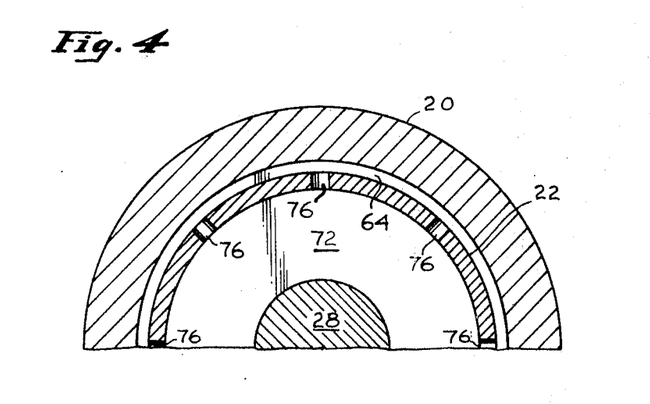
FIGURE 4 is a sectional view taken along the lines 4—4 of FIGURE 1.

A sixth air chamber 72 is formed by the tool bit 28, end portion 66 of tube member 22, and an end portion 74 coupled to the forward end of sleeve member 24. Sixth air chamber 72 communicates with fifth air chamber 64 by a plurality of radially disposed apertures 76 as shown on FIGURE 4, which is taken along the line 4—4 of FIGURE 1. Chamber 64 is vented to regions external tool 10 through axially disposed apertures 78 in end portion 66 of tube member 22 and venting passages 80 between tool bit 28 and retainer 30. Venting passages 80 communicate with apertures 78 through end volume 81 which is formed by inner wall portions of barrel member 20, retainer 30, tool bit 28, and end portion 66 of tube member 22.

Annular grooves are provided in sleeve member 24 to define a seventh air chamber 82 that communicates, in the position shown on FIGURE 1, with first air chamber 32 by a plurality of radially disposed apertures 84 in tube member 22. The apertures 84 may be a plurality of radial holes in tube member 22. Seventh air chamber 82 also communicates with a volume 86 formed by inner walls 75 of end portion 74, inner wall portions of sleeve member 24, piston 26, and tool bit 28 through radial apertures 88. End portion 74 of sleeve member 24 slidably engages tool bit 28 and forms a substantially gas tight or slip fit seal therewith.

Figure 5:
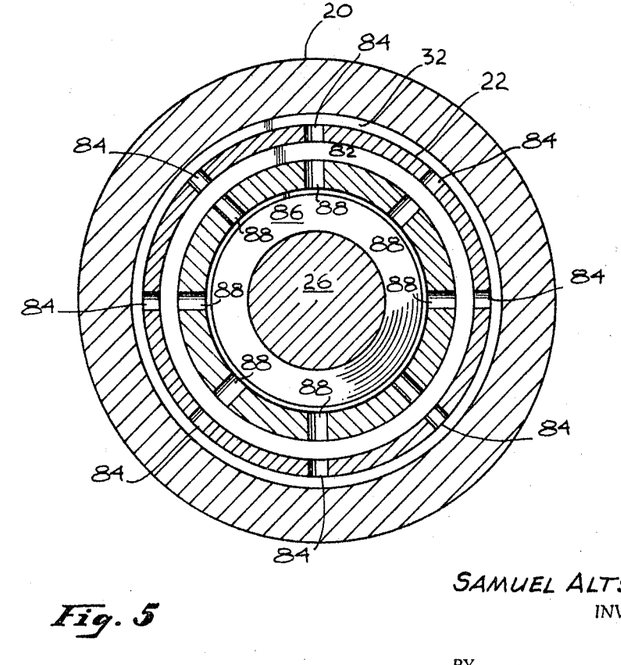
FIGURE 5 is a sectional view taken along the lines 5—5 of FIGURE 1.

FIGURE 5, which is taken along line 5—5 of FIGURE 1, shows a cross-sectional view thereof through the tool 10. In this position there is direct communication of volume 86 with the first air chamber 32 and seventh air chamber 82. As described below, however, this communication is cyclically terminated during operation of tool 10 to provide the required pressure changes for proper functioning.

Referring back to FIGURE 1, the back end of sleeve member 24 is closed by end portion 92 and the forward face 94 of end portion 92 forms the back end of a volume 96 whose other boundaries are defined by the back end 98 of piston 26 and wall portions 100 of sleeve 24. Volume 96 communicates with third air chamber 46 through a plurality of radial apertures 102. Since third air chamber 56 is vented to regions external the tool 10, the pressure in volume 96 is substantially atmospheric in the position shown in FIGURE 1.

For the position shown in FIGURE 1, there is a net force exerted on the sleeve member 24 tending to move the sleeve 24 in the forward direction. This force is:

$$F_S = A_{75}P_{86} + A_{60}P_{56} - A_{94}P_{96} \quad (2)$$

where:

$F_S$ = net force on the sleeve 24
$A_{75}$ = area of wall portion 75
$P_{86}$ = pressure in volume 86
$A_{60}$ = area of shoulder 60
$P_{56}$ = pressure in fourth air chamber 56
$A_{94}$ = area of face 94
$P_{96}$ = pressure in volume 96

Similarly, for the position shown in FIGURE 1, the piston 26 is subjected to a net force tending to move the piston 26 to the back. Since the area $A_{94}$ of face 94 is the same as the projected area of the forward end of 104 of the piston 26, which is also the same as the area of the back end 98 of the piston 26, the net force on the piston is:

$$F_P = A_{98}P_{86} - A_{98}P_{96} + F_R \quad (3)$$

where:

$F_P$ = net force on the piston 26
$A_{98}$ = area of piston 26
$P_{86}$ = pressure in volume 86
$P_{96}$ = pressure in volume 96
$F_R$ = rebound force The forces $F_T$, $F_S$, $F_P$, and $F_R$ are indicated schematically on FIGURE 1 by arrows oriented in the direction of movement for the condition illustrated.

As the sleeve 24 moves in the forward direction and the piston 26 moves in the back direction, communication between the air chambers is changed. Seventh air chamber 82 is isolated from the supply pressure in first chamber 32 as rear shoulder 105 of seventh air chamber 82 passes apertures 84. This temporarily seals the air in volume 86 at the supply pressure and as the piston 26 moves backward, the air in volume 86 expands thereby decreasing the pressure $P_{86}$ in volume 86 and thus decreases both the net force $F_P$ exerted on the piston 26 and the net force $F_S$ exerted on the sleeve 24, as shown by Equations 2 and 3. Also, as apertures 102 pass end shoulder 106 of third air chamber 46, the air in volume 96 is confined and, as the piston 26 moves backward, the air in volume 96 is compressed. This further decreases the forces $F_P$ and $F_S$ on the piston 26 and sleeve member 24, respectively, in the directions shown by the arrows $F_P$ and $F_S$.

As sleeve member 24 continues to move forward at a decreasing rate, apertures 102 pass shoulder 62 of fourth air chamber 56 and air at the supply pressure from first air chamber 32 enters volume 96 since the plurality of apertures 58 still communicate with fourth air chamber 56. The air at the supply pressure acting on the forward face 94 of end portion 92 of sleeve member 24 and on the back end 98 of piston 26 further decreases the force $F_P$ on piston 26 and the force $F_S$ on sleeve member 24. Also, a forward shoulder 108 of seventh air chamber 82 passes radial apertures 110 in tube member 22 communicating with fifth air chamber 64 which is vented to regions exterior tool 10. This vents the air in volume 86 which decreases the forces $F_P$ and $F_S$ exerted on piston 26 and sleeve member 24, as shown by Equations 2 and 3.

As piston 26 passes apertures 102, the air in volume 96 is sealed and is compressed above the supply pressure from tank 16 due to the kinetic energy of both the piston 26 and sleeve member 24. Since the volume 86 is vented to regions exterior tool 10, the forward face 104 of piston 26 is exposed to a comparatively low pressure while the back end 98 is exposed to a comparatively high pressure.

Thus, applicant has provided, essentially, a compound free piston arrangement in that the piston 26 is a free piston moving reciprocally in sleeve member 24, and sleeve member 24 itself is a free piston moving reciprocally in tube member 22. Similarly, tube member 22 is free to slide in barrel member 20 in response to the forces acting thereon.

Figure 6:
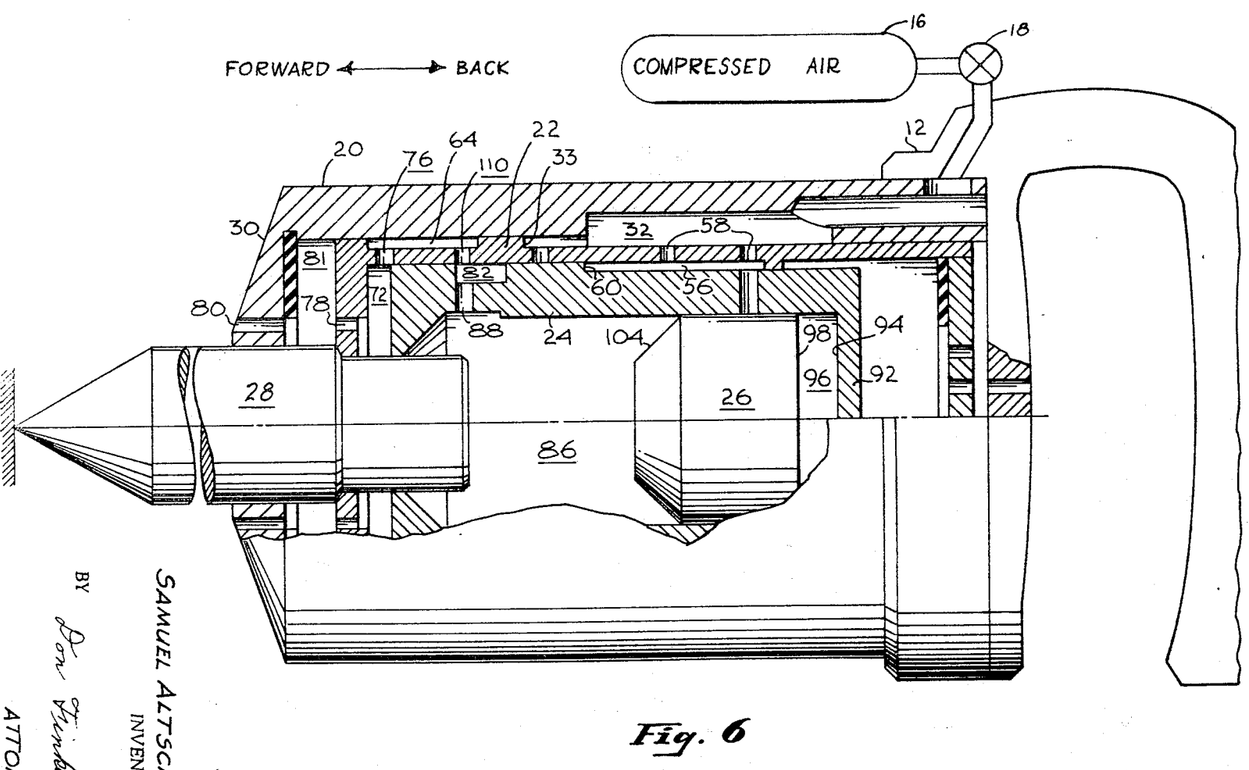
FIGURE 6 is a sectional view of the embodiment shown in FIGURE 1 in a second operational position thereof.

FIGURE 6 illustrates the tool 10 for the condition where the piston 26 has reached its maximum travel in the backward direction and is about to reverse its direction of movement and move in the forward direction to deliver the power stroke to tool bit 28. The forward face 104 of piston 26 is exposed to the pressure in volume 86. This volume is now considerably larger than it was for the condition shown in FIGURE 1 and is vented to regions exterior the tool 10 through radial apertures 88, seventh air chamber 82, radial apertures 110, fifth air chamber 64, radial apertures 76, apertures 78, end volume 81, and venting passages 80. Thus, the force on the forward end 104 of piston 26 is comparatively small. The back end 98 of piston 26, however, is subjected to the pressure in volume 96. This volume is now considerably smaller than it was for the condition shown in FIGURE 1 and the pressure therein is greater than the supply pressure in tank 16 since the kinetic energy of the piston 26 moving backward and the sleeve member 24 moving forward have compressed the air trapped in the sealed volume 96. This high pressure in volume 96 creates a force on the piston 26 to start it in the forward direction to impact on the tool bit 28.

The sleeve member 24 has reached its maximum forward movement and is about to reverse its direction of movement and move in the backward direction to the position shown in FIGURE 1. Since the sixth air chamber 72 is vented to regions external the tool 10, as discussed above, the only air forces acting on the sleeve member 24 are the force on shoulder 60, from the supply pressure in fourth air chamber 56 which is in the forward direction, and the force on forward face 94 of end portion 92 from the comparatively high pressure in the volume 96. Since the force on the forward face 94 is much greater than the force on the shoulder 60, the sleeve member 24 now moves in the backward direction.

As the piston 26 moves forward to deliver the power stroke to the tool bit 28 and, simultaneously, the sleeve member 24 moves backward, the cycle of opening and closing the various apertures described above is reversed and repetitive operation of the tool 10 is provided. The relative movement of the piston 26 after rebound from the tool bit 28 and the sleeve member 24 eliminates the vibration forces to the operator associated with the piston 26 and absorbs the energy associated therewith completely internally, not transmitting any of these forces to the barrel member 20 or handle 12. The only reactive force transmitted to the handle 12 through barrel member 20 is, as described above, the product of the pressure in first air chamber 32 multiplied by the area of shoulder 33. In the preferred embodiment of applicant's invention, first air chamber 32 and fourth air chamber 56, which are interconnected by radial apertures 58, are made comparatively large so that the pressure therein, which is nominally the supply pressure from tank 16, only varies a comparatively small amount as the volume of fourth air chamber 56 varies during the movement of sleeve member 24. To minimize these variations even further, applicant has found it advantageous to have the mass of sleeve member 24 considerably greater than the mass of piston 26 in his preferred embodiment. This provides a comparatively small movement of the sleeve member 24 for a given stroke of the piston 26.

The force exerted on the tool bit 28 by the tube member 22 is the product of the pressure in first air chamber 32 and fourth air chamber 56 multiplied by the difference in area between shoulder 33 and shoulder 62 and, consequently, in the preferred embodiment of applicant's invention, this force is also maintained substantially constant by maintaining the pressure in these chambers substantially constant.

Since the air passages in applicant's tool 10 are cyclically opened and closed by the relative sliding movement of the various elements therein, separate valve mechanisms operating at high frequency are eliminated to provide a more economical and efficient operation.

While the embodiments of applicant's invention herein have been described as utilizing compressed air as the working medium to operate the tool 10, it will be appreciated that any pressurized fluid, such as compressed nitrogen, pressurized exhaust gases from an internal or external prime mover engine, and the like, could also be utilized. Similarly, the particular orientational position of the various air chambers, interconnecting apertures, and venting passages shown is just one of many possible arrangements thereof for achieving a constant recoil, vibration free, and valveless operation of a reciprocating fluid powered tool.

Those skilled in the art will find many variations and adaptations of applicant's invention. Therefore, the foregoing description of the various embodiments of applicant's invention together with the accompanying drawing are intended to be illustrative and not limiting and the appended claims are intended to cover all variations and adaptations within the true scope and spirit of this invention.

The embodiments of the invention in which an exclusive property or privilege is claimed are defined as follows:

1. A valveless pressure fluid operated vibrationless and reactionless tool capable of maintaining steady work output having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assure the continuous positioning of the said cylinder for subsequent work output independent of recoil or vibration forces, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, a pressure fluid actuating piston surface on the said tube member of sufficient size to provide a reaction pressure force to the said cylinder thus causing the cylinder member to be continuously positioned toward the said tool bit permitting successive said piston blows against the said tool bit, a compression chamber between the said free piston and the said cylinder with pressure cyclically controlled by the fluid pressure access, piston location and velocity, or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit, pressure fluid actuating piston surfaces on the said tube member of sufficient size to provide a reaction pressure force to the said cylinder and to provide a reaction pressure force opposing the weight of the barrel member and holding means, thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

2. A valveless, pressure fluid operated vibrationless and reactionless tool capable of maintaining steady work output having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assure the continuous positioning of the said cylinder for subsequent work output independent of recoil or vibration forces, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, a compression chamber between the said free piston and the said cylinder with pressure cyclically controlled by the fluid pressure access, piston location and velocity, or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit, pressure fluid actuating piston surfaces on the said tube member of sufficient size to provide a reaction pressure force to the said cylinder and to provide a reaction pressure force opposing the weight of the barrel member and holding means thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube, and cylinder with apertures at the tool bit end to permit penetration of the tool bit through the slightly oscillating tube member and the rapidly oscillating cylinder member into the position where the tool bit can be struck by the free piston with fluid pressure venting at either end of the barrel, tube, and cylinder to permit cyclic utilization of the pressure fluid for tool operation and application of venting pressure fluid to the outer environment including the working surface.

3. A valveless, pressure fluid operated vibrationless tool capable of maintaining steady work output having in combination, a free piston constrained to oscillate within a cylinder of substantially greater mass thereby substantially reducing the sensible reaction stroke amplitude, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, a compression chamber between the said free piston and the said cylinder with pressure cyclically controlled by the fluid pressure access, piston location and velocity, or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

4. A valveless, pressure fluid operated vibrationless tool capable of being essentially reactionless in a downward operating orientation having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assure the continuous positioning of the said cylinder for subsequent work output independent of recoil or vibration forces, a barrel member and holding means which houses and guides the reciprocating free piston and cyclinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, pressure fluid actuating piston surfaces on the said tube member of sufficient size to provide a reaction pressure force to the said cylinder and to provide a reaction pressure force opposing the weight of the barrel member and holding means thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations, a pressure fluid actuating piston surface on the said tube member of sufficient size to provide a reaction pressure force to the said cylinder thus causing the cylinder member to be continuously positioned toward the said tool bit permitting successive said piston blows against the said tool bit, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

5. A valveless, pressure fluid operated vibrationless tool having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assure the continuous positioning of the said cylinder for subsequent work output independent of recoil or vibration forces, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, a pressure fluid actuating piston surface on the said tube member of sufficient size to provide a reaction pressure force to the said cylinder thus causing the cylinder member to be continuously positioned toward the said tool bit in time for successive said piston blows against the said tool bit, incorporation of porting orifices located on the said cylinder in relation to the said free piston and said tube member thereby utilizing the relatively short reaction stroke of the said cyinder to cyclically control the pressure fluid access to the said free piston, venting, and compression between the said free piston and the said cylinder thereby eliminating the need for a separate valve member to accomplish these functions, closure members for the said barrel, tube and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

6. A valveless, pressure fluid operated vibrationless tool having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assume the continuous positioning of the said cylinder for subsequent work output independent of recoil or vibration forces, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assume continuous operation of the said free piston and cylinder combination while maintaining pressure fluid continuity with the accumulator volume, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for total operation and application of venting pressure fluid to the outer environment including the working surface.

7. A valveless pressure fluid operated vibrationless tool having in combination, a free piston constrained to oscillate within a cylinder of substantially greater mass thereby substantially reducing the sensible reaction stroke amplitude, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, incorporation of porting orifices located on the said cylinder in relation to the said free piston and said tube member thereby utilizing the relatively short reaction stroke of the said cylinder to cyclically control the pressure fluid access to the said free piston, venting, and compression between the said free piston and the said cylinder thereby eliminating the need for a separate valve member to accomplish these functions, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

8. A pressure fluid operated vibrationless and reactionless tool capable of maintaining steady work output having in combination,     a free piston constrained to oscillate within a cylinder of substantially greater mass thereby substantially reducing the sensible reaction stroke amplitude,     a pressure fluid actuating piston surface on the said cylinder thereby assuring continuous thrust of the free piston cylinder combination in the direction of applied external work to assure the continuous positioning of the said cylinder for subsequent work output independent of recoil or vibration forces,     a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator,     a tool bit member guided by the said barrel and slidably mounted therein with stepped cylindrical diameters penetrating into the said cylinder thereby receiving an impact blow on each cycle of the said free piston,     a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume,     a pressure fluid actuating piston surface on the said tube member of sufficient size to provide a reaction pressure force to the said cylinder thus causing the cylinder member to be continuously positioned toward the said tool bit permitting successive said piston blows against the said tool bit,     a compression chamber between the said free piston and the said cylinder with pressure cyclically controlled by the fluid pressure access, piston location and velocity, or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit,     pressure fluid actuating piston surfaces on the said tube member of sufficient size to provide a reaction pressure force to the said cylinder and to provide a reaction pressure force opposing the weight of the barrel member and holding means, thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations,     closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

9. A pressure fluid operated vibrationless and reactionless tool capable of maintaining steady work output having in combination,     a free piston constrained to oscillate within a cylinder of substantially greater mass thereby substantially reducing the sensible reaction stroke amplitude,     a pressure fluid actuating piston surface on the said cylinder thereby assuring continuous thrust of the free piston cylinder combination in the direction of applied external work to assure the continuous positioning of the said cylinder for subsequent work output independent of recoil or vibration forces,     a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator,     a tool bit member guided by the said barrel and slidably mounted therein with stepped cylindrical diameters penetrating into the said cylinder thereby receiving an impact blow on each cycle of the said free piston,     a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume,     a compression chamber between the said free piston and the said cylinder with pressure cyclically controlled by the fluid pressure access, piston location and velocity or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit, pressure fluid actuating piston surfaces on the said tube member of sufficient size to provide a reaction pressure force to the said cylinder and to provide a reaction pressure force opposing the weight of the barrel member and holding means, thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

10. A pressure fluid operated vibrationless tool capable of maintaining steady work output having in combination, a free piston constrained to oscillate within a cylinder of substantially greater mass thereby substantially reducing the sensible reaction stroke amplitude, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, a compression chamber between the said free piston and the said cylinder with pressure cyclically controlled by the fluid pressure access, piston location and velocity, or venting position of the said cylinder in relation to the said tube member or the said free piston thereby conserving the piston energy during the non-working or lifting stroke and adding it to the fluid pressure applied during the said piston working or downward stroke and thereby serving to also maintain a steady work output at a given initial fluid pressure since faster rebound of the said free piston from the said tool bit will reduce the inlet pressure fluid access time to the said compression chamber thereby resulting in a compensating reduction in downward or working velocity of the said free piston as it returns to the said tool bit, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

11. A pressure fluid operated vibrationless tool capable of being essentially reactionless in a downward operating orientation and providing constant recoil in other orientations having in combination, a free piston constrained to oscillate within a cylinder of substantially greater mass thereby substantially reducing the sensible reaction stroke amplitude, a pressure fluid actuating piston surface on the said cylinder thereby assuring continuous thrust of the free piston cylinder combination in the direction of applied external work to assure the continuous positioning of the said cylinder for subsequent work output independent of recoil or vibration forces, a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator, a tool bit member guided by the said barrel and slidably mounted therein with stepped cylindrical diameters penetrating into the said cylinder thereby receiving an impact blow on each cycle of the said free piston, a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, pressure fluid actuating piston surfaces on the said tube member of sufficient size to provide a reaction pressure force to the said cylinder and to provide a reaction pressure force opposing the weight of the barrel member and holding means, thus causing the cylinder member to be continuously positioned toward the said tool bit and also opposing the weight of the barrel and holder so that this work does not have to be provided by the tool operator thereby achieving a substantially recoilless reaction tool in the downward direction and constant recoil in other orientations, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

12. A pressure fluid operated vibrationless tool having, in combination,
   a free piston constrained to oscillate within a cylinder of substantially greater mass thereby substantially reducing the sensible reaction stroke amplitude,
   a pressure fluid actuating piston surface on the said cylinder thereby assuring continuous thrust of the free piston cylinder combination in the direction of applied external work to assure the continuous positioning of the said cylinder for subsequent work output independent of recoil or vibration forces,
   a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator,
   a tool bit member guided by the said barrel and slidably mounted therein with stepped cylindrical diameters penetrating into the said cylinder thereby receiving an impact blow on each cycle of the said free piston,
   a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume,
   a pressure fluid actuating piston surface on the said tube member of sufficient size to provide a reaction pressure force to the said cylinder thus causing the cylinder member to be continuously positioned toward the said tool bit permitting successive said piston blows against the said tool bit,
   closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

13. A pressure fluid operated vibrationless tool having, in combination,
   a free piston constrained to oscillate within a cylinder of substantially greater mass thereby substantially reducing the sensible reaction stroke amplitude,
   a pressure fluid actuating piston surface on the said cylinder thereby assuring continuous thrust of the free piston cylinder combination in the direction of applied external work to assure the continuous positioning of the said cylinder for subsequent work output independent of recoil or vibration forces,
   a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator,
   a tool bit member guided by the said barrel and slidably mounted therein with stepped cylindrical diameters penetrating into the said cylinder thereby receiving an impact blow on each cycle of the said free piston,
   a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume,
   closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

14. A pressure fluid operated vibrationless tool having, in combination,
   a free piston constrained to oscillate within a cylinder of substantially greater mass thereby substantially reducing the sensible reaction stroke amplitude,
   a barrel member and holding means which houses and guides the reciprocating free piston and cylinder combination and incorporates a relatively large accumulator section for storage, transmission, and connection of the pressure fluid flowing from the pressure fluid source to the said free piston and cylinder combination, said accumulator section volume and connected pressure fluid source being thus able to substantially reduce the magnitude of the oscillating barrel reaction force to a point which, coupled with the stroke reduced by the said free piston and cylinder combination renders the barrel handle essentially vibrationless to the operator,
   a tool bit member guided by the said barrel and slidably mounted therein with stepped cylindrical diameters penetrating into the said cylinder thereby receiving an impact blow on each cycle of the said free piston,
   a tube member interjected between the said cylinder and barrel member and with stepped shoulder areas protruding into the said accumulator arranged to provide a continuous thrust against the said tool bit thereby eliminating the tool bit bounce contribution to the recoil and vibration of the reciprocating tool and with substantially large porting orifices positioned to admit pressure fluid to the said cylinder at predetermined positions as required to assure continuous operation of the said free piston and cylinder combination while maintaining pressure fluid continuity with the accumulator volume, closure members for the said barrel, tube, and cylinder with apertures at the tool bit end to permit penetration of the tool bit through the slightly oscillating tube member and the rapidly oscillating cylinder member into the position where the tool bit can be struck by the free piston and with fluid pressure venting at either end of the barrel, tube, and cylinder to permit cyclic utilization of the pressure fluid for tool operation and application of venting pressure fluid to the outer environment including the working surface.

References Cited

UNITED STATES PATENTS

| | | | |
|---|---|---|---|
| 1,044,263 | 11/1912 | Schumacher | 173—139 X |
| 1,825,632 | 9/1931 | Kroukovsky et al. | 173—18 |
| 2,187,502 | 1/1940 | Shaff | 173—162 |

JAMES A. LEPPINK, Primary Examiner

U.S. Cl. X.R.

91—217; 173—139